United States Patent
Matsuda et al.

(10) Patent No.: US 7,918,131 B2
(45) Date of Patent: Apr. 5, 2011

(54) TIRE SLIP STATE DETECTING METHOD AND TIRE SLIP STATE DETECTING APPARATUS

(75) Inventors: Jun Matsuda, Kanagawa (JP); Tsuyoshi Kitazaki, Kanagawa (JP); Naoshi Miyashita, Kanagawa (JP); Yoshiaki Hashimura, Kanagawa (JP); Yutaka Hattori, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1228 days.

(21) Appl. No.: 10/594,208

(22) PCT Filed: Nov. 21, 2005

(86) PCT No.: PCT/JP2005/021368
§ 371 (c)(1),
(2), (4) Date: Sep. 21, 2006

(87) PCT Pub. No.: WO2006/054744
PCT Pub. Date: May 26, 2006

(65) Prior Publication Data
US 2007/0205879 A1      Sep. 6, 2007

(30) Foreign Application Priority Data
Nov. 19, 2004   (JP) .................................. 2004-335767

(51) Int. Cl.
*B60C 23/02* (2006.01)
(52) U.S. Cl. ..................................... 73/146.5
(58) Field of Classification Search .................... None
See application file for complete search history.

(56) References Cited

U.S. PATENT DOCUMENTS

| | | | |
|---|---|---|---|
| 6,538,566 B1 | 3/2003 | Morand et al. | |
| 6,640,623 B2 * | 11/2003 | Ono et al. | 73/146 |
| 6,644,108 B2 * | 11/2003 | Inoue | 73/146 |
| 7,370,523 B2 * | 5/2008 | Kitazaki et al. | 73/146 |

(Continued)

FOREIGN PATENT DOCUMENTS

EP   1 219 515 A1   7/2002

(Continued)

OTHER PUBLICATIONS

European Search Report by European Patent Office on Jul. 23, 2007.
Translation of the International Preliminary Report on Patentability, mailed on May 31, 2007.

*Primary Examiner* — Andre J Allen
(74) *Attorney, Agent, or Firm* — Knobbe Martens Olson & Bear LLP

(57) ABSTRACT

To detect a slip state in a contact region of a rotating tire on a road surface, first, the first radical direction data and the second width direction data of measurement data of acceleration at a tread portion of the rotating tire for a duration corresponding to one round of tire rotation are acquired. Second, time series data of acceleration due to tire deformation is extracted from the first radical direction data and displacement data is obtained by subjecting the time series data of acceleration due to tire deformation to a time integration of second order, thereby a deformation at the tread portion is calculated and a contact region of the rotating tire is determined from the calculated deformation. Next, from the second width direction data, a slip region within the determined contact region is specified based on vibration level of the second data.

17 Claims, 8 Drawing Sheets

| U.S. PATENT DOCUMENTS | | | | FOREIGN PATENT DOCUMENTS | | |
|---|---|---|---|---|---|---|
| 2003/0058118 | A1 | 3/2003 | Wilson | JP | 2002-511812 | 4/2002 |
| 2005/0085987 | A1 | 4/2005 | Yokota et al. | JP | 2002-340863 | 11/2002 |
| 2006/0201240 | A1* | 9/2006 | Morinaga ............... 73/146 | JP | 2003-182476 | 7/2003 |
| 2007/0084276 | A1* | 4/2007 | Matsuda et al. ......... 73/146 | JP | 2004-340616 | 12/2004 |
| 2007/0213953 | A1* | 9/2007 | Kitazaki et al. ......... 702/157 | * cited by examiner | | |

TIRE SLIP STATE DETECTING METHOD AND TIRE SLIP STATE DETECTING APPARATUS

TECHNICAL FIELD

The present invention relates to a tire slip state detecting method for detecting a slip state in a contact region of a tire which is rotating on a road surface, and an apparatus implementing the method.

BACKGROUND ART

When a vehicle makes a turn, a tread portion of a tire that has a slip angle slips partially against the road surface. In other words, in a contact region of the tread portion of the tire, there mixedly exist a region (adhesion region) in which the tread portion adheres to the road surface and a region (slip region) in which the tread portion slips against the road surface. As the slip angle increases, the adhesion region is decreased while the slip region is increased, which finally leads to the whole contact region of the tire becoming the slip region, and the tire as a whole causing slide slipping (slide slip behavior).

Generally, the slide slip behavior is difficult for the vehicle driver to detect, and moreover, once the slide slip behavior occurs, suppressing the slide slip behavior to restore the steering under control is almost impossible. Consequently, the vehicle experiences out of steering control which in turn could result in a vehicle crash.

In an effort to solve such problems, there have been control systems of anti-lock braking systems (ABS) that are mounted on vehicles to prevent occurrence of slide slipping. For instance, in ABS systems, a slip ratio of the tire is estimated by using measured rotation speeds and traveling speeds of the tire, and the occurrence of the slide slip behavior is estimated based on measured data of rotation torque applied to the vehicle axle, so that the brake is controlled to prevent the possibility of occurrence of the slide slip behavior.

However, since such control is achieved by measuring the forces and speeds that are applied to the tire as a whole, it has not always been able to estimate the occurrence of the slide slip behavior with accuracy. Particularly, it has been unable to estimate the slide slip behavior based on information of the slip region in the contact region of the tire.

The following Patent Documents 1 to 3 disclose, for instance, a method in which an acceleration sensor is attached to a tire to acquire measurement data of acceleration of the tire during rotation, and from the acquired measurement data, power spectrums and vibration spectrums are obtained to estimate the status of the road during the tire rotation, and a method in which a timing at which a tread portion is in contact with a road surface is determined from measurement data of acceleration in a radial direction.

However, any one of the Patent Documents 1 to 3 does not allow detection of a slide slip state from the measurement data of acceleration, though it is possible to estimate the status of the road surface using the measurement data.

Patent Document 1: JP 2002-340863 A
Patent Document 2: JP 2003-182476 A
Patent Document 3: JP 2002-511812 A

DISCLOSURE OF THE INVENTION

Problems to be Solved by the Invention

In view of the above problems, the present invention has an object to provide a tire slip state detecting method and a tire slip state detecting apparatus that detect a slip state in a contact region of a tire which is rotating on a road surface.

Means to Solve the Problems

In order to achieve the above object, the present invention provides a tire slip state detecting method for detecting a slip state in a contact region of a tire which is rotating on a road surface, the method comprising:

an acquiring step for acquiring measurement data of acceleration at a tread portion of the rotating tire for a duration corresponding to at least one round of tire rotation, the measurement data including at least measurement data of acceleration in a radial direction of the tire;

a contact region determining step including, extracting time series data of acceleration due to tire deformation from the acquired measurement data in the radial direction, subjecting the time series data of acceleration due to tire deformation to a time integration of second order to obtain displacement data, thereby calculating a deformation in the tread portion of the tire, and determining, from the calculated deformation, a contact region of the tire during rotation;

a slip region specifying step for specifying, from the measurement data of acceleration acquired in the acquiring step, a slip region within the determined contact region.

In the slip region specifying step, the measurement data of acceleration used in specifying the slip region is preferably acceleration data in a width direction of the tire.

In the slip region specifying step, it is preferable to extract, from the measurement data of acceleration acquired in the acquiring step, high frequency components of a predetermined frequency range from the measurement data of acceleration acquired in the acquiring step to specify the slip region based on an amplitude level in the high frequency components.

In the above, preferably the slip region is determined when a frequent number of occurrences in which an amplitude level of the high frequency components exceeds a reference value, is higher than a predetermined frequency number.

It is also preferable for the slip region specifying step to calculate an area ratio of the slip region to the contact region to evaluate the slip state in quantity.

Further, it is preferable for the contact region determining step to include a step of dividing a region on a circumference of the tread portion of the tire into a first region including a contact region in contact with the road surface, and a second region including other than the first region, approximating the measurement data in the radial direction in the second region to calculate a first approximation curve defined in the first and second regions, and subtracting the first approximation curve from the measurement data in the radial direction to extract time series data of acceleration due to tire deformation in the first and second regions; and a step of dividing a region on the circumference of the tread portion of the tire into a third region including a contact region in contact with the road surface, and a fourth region including other than the third region, and approximating the displacement data in the fourth region to calculate a second approximation curve defined in the third and fourth regions, and subtracting the second approximation curve from a waveform of the displacement data to calculate a deformation of the tire.

In the above, preferably, the first approximation curve approximates the measurement data in the radial direction in the first region in addition to the second region, using a plurality of data points of the measurement data in the radial direction in the second region as nodes. Preferably, the first approximation curve is calculated by applying weighting coefficients to the time series data of acceleration in the first region and to the time series data of acceleration in the second region; and a greater weighting coefficient is applied to the time series data of acceleration in the second region than a weighting coefficient applied to the time series data of acceleration in the first region to approximate the time series data of acceleration in the first and second regions. Preferably, the second region and the fourth region have an angle in a circumferential direction of at least 60 degree in absolute values, the angle being obtained relative to a center position of the contact region of the tire.

Preferably, the second approximation curve is a curve which approximates the displacement data in the fourth region in addition to the third region, using a plurality of data points in the displacement data in the fourth region as nodes. Preferably, the second approximation curve is calculated using a least squares method by applying weighting coefficients to the displacement data in the third region and to the displacement data in the fourth region, and a greater weighting coefficient is applied to the displacement data in the fourth region than a weighting coefficient applied to the displacement data in the third region to approximate the displacement data in the third and fourth regions.

The measurement data of acceleration is obtained through an acceleration sensor arranged on the tread portion of the tire. A plurality of acceleration sensors may be arranged on the circumference of the tread portion of the tire. The plurality of acceleration sensors may be arranged in a width direction of the tread portion of the tire.

It is preferable to determine the contact region by obtaining two positions at which the tire series data of acceleration due to tire deformation crosses an acceleration of zero, and by taking the two positions as a leading edge and a trailing edge of the contact region of the tire. The time series data of acceleration due to tire deformation which is used in the determination of the contact region is preferably obtained by subjecting the calculated deformation of the tread portion to a differentiation of second order with respect to time. Alternatively, it is also preferable that the a deformation shape of the tire is obtained from the displacement data, and the contact region is determined by taking positions at which the tire deformation shape crosses a line having a certain distance in an upward direction away from a lowest point in the tire as a leading edge and a trailing edge of the contact region.

The present invention further provides a tire slip state detecting apparatus for detecting a slip state in a contact region of a tire which is rotating, the apparatus comprising:

an acquiring unit for acquiring measurement data of acceleration at a tread portion of the rotating tire for a duration corresponding to at least one round of tire rotation, the measurement data including at least measurement data of acceleration in a radial direction of the tire;

a contact region determining unit for extracting time series data of acceleration due to tire deformation from the acquired measurement data in the radial direction, subjecting the time series data of acceleration due to tire deformation to a time integration of second order to calculate displacement data, thereby calculating a deformation in the tread portion of the tire, and determining, from the calculated deformation, a contact region of the tire during rotation; and a slip region specifying unit for specifying, from the measurement data of acceleration acquired in the acquiring step, a slip region within the determined contact region.

In the slip state identifying step, the measurement data of acceleration used in identifying the slip region is preferably acceleration data in a width direction of the tire.

EFFECTS OF THE INVENTION

In the present invention, since the contact region of the tire is identified from the measurement data of acceleration in the radial direction of the tire, by using the identified region, the slip state in the contact region can be efficiently identified from the measurement data of acceleration.

In this case, identification of the slip state can be achieved with high accuracy because high frequency components of a specified frequency band are extracted from the acquired measurement data of acceleration of the tire, preferably, from the acquired measurement data of acceleration in the width direction of the tire, and the slip region is identified based on the amplitude level in the high frequency components. In particular, efficient and accurate identification of the slip region is achieved by determining the slip region if the frequency of occurrences in which the amplitude level of the high frequency components exceeds a reference value is higher than a predetermined frequency.

Figure 1:
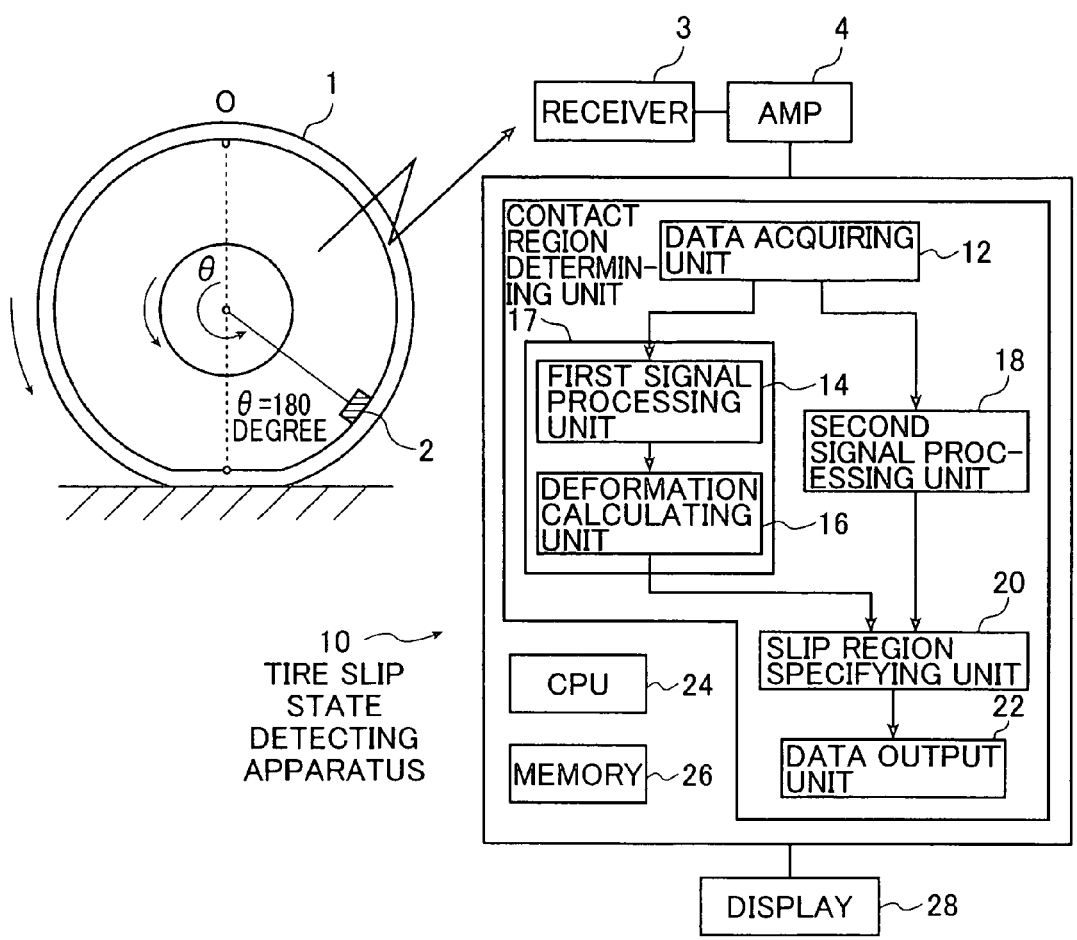
FIG. 1 is a block diagram showing an example of a tire slip state detecting apparatus implementing a tire slip state detecting method of the present invention.

LEGEND 1 tire
2 acceleration sensor
3 receiver
4 amplifier
10 tire slip state detecting apparatus
12 data acquiring unit
14 first signal processing unit
16 deformation calculating unit
18 second signal processing unit
20 slip region specifying unit
22 data output unit
24 CPU 26 memory
28 display

BEST MODE FOR CARRYING OUT THE INVENTION

Hereinafter, the tire slip state detecting method and the tire slip state detecting apparatus according to the present invention will be described in detail with reference to the preferred embodiments shown in the attached drawings.

FIG. 1 is a block diagram showing a structure of an embodiment of the tire slip state detecting apparatus according to the present invention that implements the tire slip state detecting method according to the present invention.

A tire slip state detecting apparatus 10 shown in FIG. 1 is an apparatus for detecting a slip state in a contact region of a tire 1 by using measurement data of acceleration obtained at a tread portion of the tire 1. The acceleration at the tread portion of the tire 1 is the measurement data of acceleration that has been detected by an acceleration sensor 2 fixed on an inner circumference surface in a tire cavity region of the tire and amplified by an amplifier 4. The measurement data acquired by the acceleration sensor 2 is the data that has been transmitted by a transmitter (not-shown) provided on the rotating tire to a receiver 3 and amplified by the amplifier 4. For example, a transmitter may be provided on a wheel assembled to the tire to transmit the measurement data from the acceleration sensor 2 to the receiver 3, or a transmitting function may be added to the acceleration sensor 2 so that the data is transmitted from the acceleration sensor 2 to the receiver 3. Alternatively, an amplifier for amplifying the data from the acceleration sensor 2 and a transmitter may be both provided on the wheel and the data received by the receiver is supplied to the tire slip state detecting apparatus 10.

The acceleration sensor 2, which is an acceleration sensor in three directions that are orthogonal to each other, is exemplified by a semiconductor acceleration sensor, for example, disclosed in Japanese Patent Application No. 2003-134727 (JP 2004-340616 A) filed by the present applicant. The semiconductor acceleration sensor includes, specifically, an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

By fixing the acceleration sensor to the tire inner circumference surface, the acceleration applied to the tread portion during tire rotation can be measured.

Although the acceleration sensor 2 is of an acceleration sensor for detecting acceleration in three directions that are orthogonal to each other, other sensors may be used as the acceleration sensor 2, including acceleration pickups that use piezoelectric elements for detecting acceleration in three directions that are orthogonal to each other, and distortion gage type acceleration pickups that incorporate distortion gages for detecting acceleration in three directions that are orthogonal to each other. In the practice of the present invention, acceleration in the tire width direction and acceleration in the tire radial direction are measured. Acceleration sensors capable of measuring acceleration in the tire circumferential direction, in addition to the acceleration in those two directions may be used.

The tire slip state detecting apparatus 10, to which the measurement data of acceleration amplified by the amplifier 4 is supplied, has a data acquiring unit 12, a first signal processing unit 14, a deformation calculating unit 16, a second signal processing unit 18, a slip region specifying unit 20, and a data output unit 22. These units are configured by subroutines and subprograms executable on a computer. In other words, the above individual units are operated by execution of software on a computer that has a CPU 24 and a memory 26, thus forming the tire slip state detecting apparatus 10. The first signal processing unit 14 and the deformation calculating unit 16 constitute a contact region determining unit 17.

Alternatively, instead of using a computer, the tire slip state detecting apparatus 10 may be a dedicated apparatus in which functions of individual units are configured by a dedicated circuit.

The data acquiring unit 12 is a unit for acquiring, as input data, measurement data of acceleration for a duration corresponding to at least one round of tire rotation, which has been amplified by the amplifier 4. The data supplied from the amplifier 4 is in a form of analog data which is then converted to digital data by sampling with a predetermined sampling frequency. Among the digital data, the measurement data of acceleration (first data) including at least data in the tire radial direction, and including optionally data in the tire circumference direction is supplied to the first signal processing unit 14. The measurement data of acceleration (second data) in the tire width direction is supplied to the second signal processing unit 18.

The first signal processing unit 14 is a unit for extracting time series data of acceleration due to tire deformation from the digitized measurement data of acceleration (first data) including at least data in the tire radial direction, and including optionally data in the tire circumference direction. The first signal processing unit 14 carries out smoothing processing on the first data and calculates an approximation curve to the smoothed signals so as to obtain a background component 1. The background component 1 is removed from the first data that has been subjected to smooth processing, so that the time series data of acceleration due to tire deformation is extracted.

The deformation calculating unit 16 is a unit for calculating deformation of the tire by subjecting the extracted time series data of acceleration due to tire deformation to time integration of second order to obtain displacement data. The time series data of acceleration due to tire deformation is subjected to integration of second order with respect to time. Then an approximation curve to the data obtained through integration of second order is calculated to obtain a background component 2. The obtained background component 2 is removed from the displacement data obtained through integration of second order, so that the deformation of the tire is calculated.

The second signal processing unit 18 is a unit for carrying out filtering processing and full-wave rectifying processing on the digitized measurement data of acceleration (second data) in the tire width direction, and for generating a pulse train by using the second data that has been subjected to full-wave rectifying processing.

The slip region specifying unit 20 is a unit for specifying, from the data of tire deformation obtained in the deformation calculating unit 16, a slip region, and within the range of the determined contact region, specifying a slip region by using the pulse train generated in the second signal processing unit 18.

Description will be given later on specific processing in the first signal processing unit 14, the deformation calculating unit 16, the second signal processing unit 18, and the slip region identifying unit 20.

The data output unit 22 is a unit for obtaining, from the information of the detected slip region, an area ratio of the slip region to the contact region, for evaluation in quantity. Based on the ratio, information such as a margin of safety until occurrence of slide slip behavior is obtained as the output data. The obtained output data is sent to a display 28 and used in, such as, displaying a graph.

Figure 2:
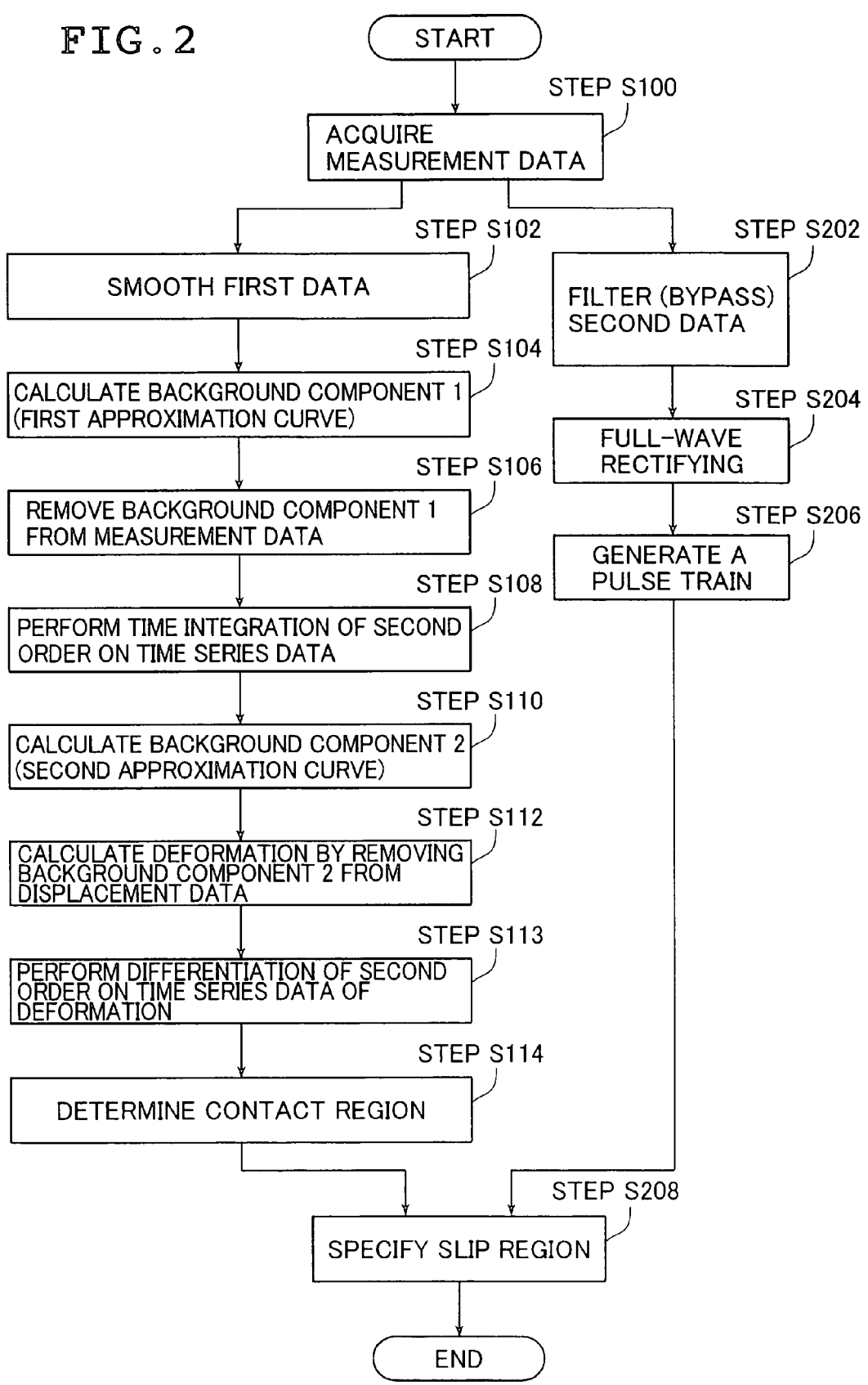
FIG. 2 is a flow chart showing an example of flow of the tire slip state detecting method according to the present invention.

FIG. 2 is a flow chart showing the steps of the tire slip state detecting method that are carried out in the tire slip state detecting apparatus 10 described above. FIGS. 3A to 3D and FIGS. 4A to 4C are graphs each showing an example of results obtained in the steps of the tire slip state detecting method. In the graphs, any of the results shown are those obtained by calculating the deformation in the radial direction at the tread portion of the tire from the measurement data of acceleration in the radial direction of the tire, among several kinds of measurement data obtainable by the acceleration sensor 2. In this example, the measurement data of acceleration in the tire radial direction is used to calculate deformation of the tire tread portion only in the radial direction, so that the contact region is determined. However, in the present invention, the displacement in the circumferential direction estimated from the measurement data of acceleration in the tire circumferential direction may be additionally used to determine the contact region.

First, acceleration amplified by the amplifier 4 is supplied to the data acquiring unit 12 and is sampled with a predetermined sampling frequency to obtain digitized measurement data (step S100).

Figure 3A:
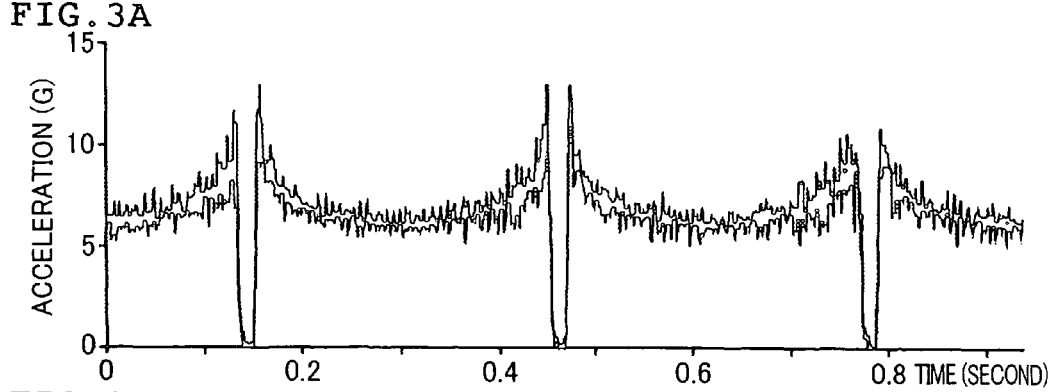
FIGS. 3A to 3D are graphs each showing a signal waveform obtained by the tire slip state detecting method according to the present invention.
Figure 3B:
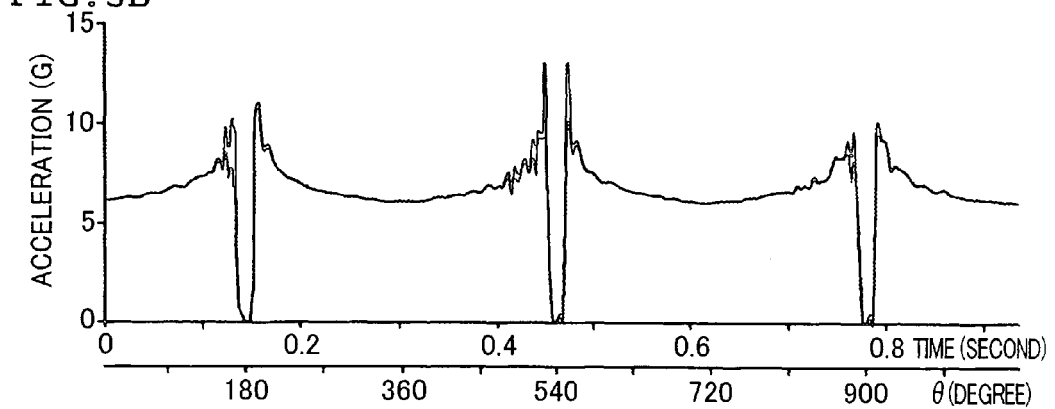

Next, among the acquired measurement data, the first data (measurement data of acceleration in the radial direction) is supplied to the first signal processing unit 14 and is subjected to smoothing processing through filters (step S102). The first data supplied to the first signal processing unit 14, as it contains many noise components as shown in FIG. 3A, is subjected to smoothing processing through filters to provide smoothed data as shown in FIG. 3B. As the filters, for example, digital filters that have a certain frequency as a cut-off frequency may be used. The cut-off frequency changes depending on rotation speeds or noise components. For example, if the rotation speed is 60(Km/h), the cut-off frequency is between 0.5 and 2 (kHz). Alternatively, instead of using the digital filters, smoothing processing may be performed using moving average process, trend model process, and other suitable processes.

In the time series graphs shown in FIG. 3B, the time axis is given in the horizontal axis and positions on the tire circumference are represented in 3 (degree). The positions of θ (degree) on the tire circumference represent angles given relative to a point O (see FIG. 1) that is located opposite to the center position (θ=180 degree) of the contact surface of the tire. The positions of θ (degree) on the circumference are obtainable by detecting marks provided on the tire with a mark detecting device (not shown) and assuming the relative positional relation between the circumferential position of the mark and the circumferential position of the acceleration sensor 2, allowing determination of the positions of θ (degree) on the circumference of the rotating tire.

In FIG. 3B, the center position of the contact surface corresponds to positions of θ=180 degree, 540 degree, and 900 degree, and the measurement data of acceleration for a duration corresponding to approximately three rounds of tire rotation is shown.

Then, the background component 1 is calculated from the smoothed measurement data of acceleration (step S104).

Figure 3C:
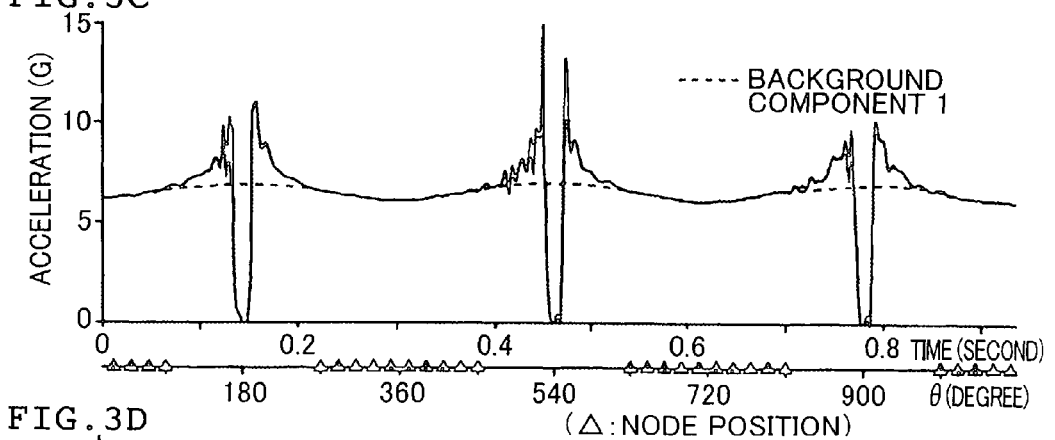

The background component 1 of the acceleration in the radial direction includes acceleration components of the centrifugal force (centripetal force) of the rotating tire and acceleration components of the gravitational force (note that these components are also included in the background component of the acceleration in the circumferential direction), and is indicated with dotted lines in the example shown in FIG. 3C. The background component 1 is obtained so as to approximate the measurement data of acceleration in the region on the circumference, that is defined by excluding angle ranges of equal to or greater than 0 degree and less than 90 degree in absolute values relative to the center position of the contact surface having a θ of 180 degree, 540 degree, and 900 degree respectively.

More specifically, the background component 1 is obtained in the following manner. The region of the tire circumference is divided into a first region including a contact region in contact with a road surface and a second region including other than the first region. The regions that are defined as the first region include a region having a θ of greater than 90 degree and less than 270 degree, a region having a θ of greater than 450 degree and less than 630 degree, and a region having a θ of greater than 810 degree and less than 990 degree. On the other hand, the regions that are defined as the second region include a region having a θ of equal to or greater than 0 degree and equal to or less than 90 degree and equal to or greater than 270 degree and equal to or less than 360 degree; a region having a θ of equal to or greater than 360 degree and equal to or less than 450 degree and equal to or greater than 630 degree and equal to or less than 720 degree; and a region having a θ of equal to or greater than 720 degree and equal to or less than 810 degree and equal to or greater than 990 degree and equal to or less than 1080 degree. The background component 1 is obtained by calculating a first approximation curve to the data in the first and the second regions by means of least squires method using a plurality of positions (θ, or time corresponding to θ) on the circumference in the second region as the nodes and using a predetermined function groups for example spline functions of third order. The nodes provide constraint conditions on the horizontal axis, that set local curvatures (jog) of the spline functions. In the example shown in FIG. 3B, the positions as indicated by "Δ" in FIG. 3B, that is, the positions of time where θ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1010 degree, 1030 degree, 1050 degree, and 1070 degree are defined as the node positions.

By carrying out function approximation on the data shown in FIG. 3B with the spline functions of third-order having the above nodes, the approximation curve as indicated by dotted lines in FIG. 3C is calculated.

In the function approximation, there are no nodes in the first regions, and only the plurality of nodes in the second regions are used, and in least squares method that is carried out in conjunction with the function approximation, weighting coefficients are used. In calculation, the weighting coefficients are set in such a manner that if the weighting coefficient for the second regions is set to 1, the weighting coefficient for the first regions is set to 0.01. The reason why the weighting coefficient for the first regions is smaller than the weighting coefficient for the second regions, and no nodes are set in the first regions in calculating the background component 1, as described above, is to calculate the first approximation curve from the measurement data of acceleration mainly in the second regions. In the second regions, the acceleration components of the rotating tire is dominated by the acceleration components of the centrifugal force (centripetal force) and the acceleration components of the gravitational force, because the deformation of the tread portion due to contact is small and changes smoothly on the circumference. In contrast, in the first regions, the deformation of the tread portion due to contact is big and changes rapidly. Accordingly, the acceleration components due to contact deformation becomes greater than the acceleration components of the centrifugal force (centripetal force) due to tire rotation and the acceleration components of the gravitational force, and such change occurs rapidly. In other words, the measurement data of acceleration in the second regions is generally the acceleration components of the centrifugal force (centripetal force) due to tire rotation and the acceleration components of the gravitational force, and by calculating the first approximation curve mainly using the measurement data of acceleration in the second regions, the acceleration components of the centrifugal force (centripetal force) due to tire rotation and the acceleration components of the gravitational force not only in the second region, but also in the first region can be estimated accurately.

Although in FIG. 3C, the first region is assumed to be the range having an angle of at least 0° and less than 90° in absolute values relative to the contact center positions ($\theta=180$ degree, 540 degree, and 900 degree), in the present invention, the first region may be at least within a range having an angle of equal to or greater than 0 degree and less than 60 degree in absolute values relative to the contact center positions.

Figure 3D:
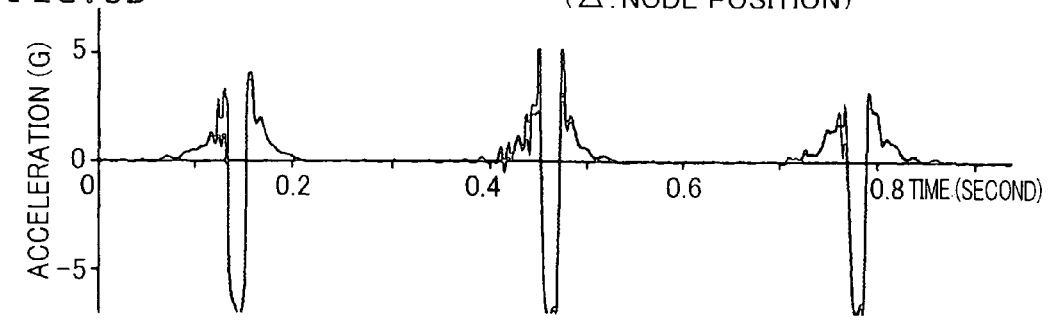

Next, the first approximation curve representing the calculated background component 1 is subtracted from the measurement data of acceleration (first data) processed in step S102, so that the acceleration components due to tire rotation and the acceleration components of the gravitational force are removed from the measurement data (step S106). FIG. 3D shows the time series data of acceleration after the removal. In this manner, the acceleration components due to contact deformation of the tire tread portion are extracted.

Subsequently, the calculated time series data of acceleration due to contact deformation is then subjected to time integration of second order in the deformation calculating unit 16 to generate displacement data (step S108).

Figure 4A:
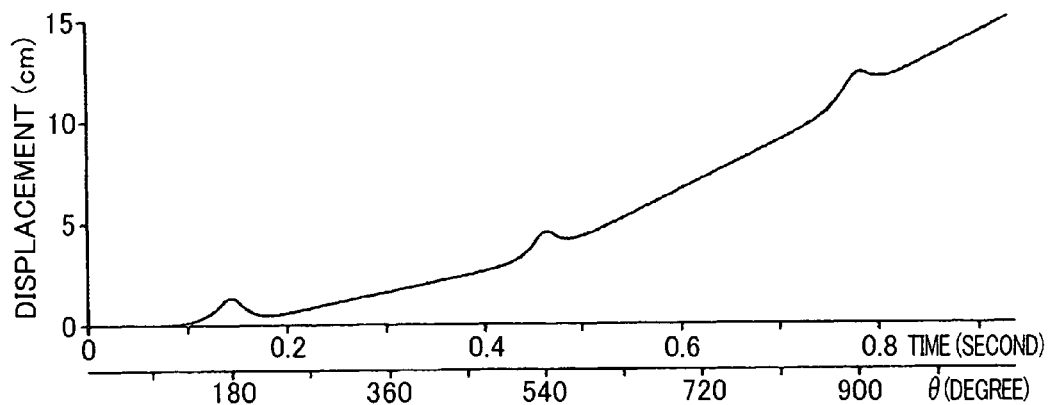
FIGS. 4A to 4C are graphs each showing a signal waveform obtained by the tire slip state detecting method according to the present invention.

Since the acceleration data to be subjected to integration generally contains noise components, when integration of second order is carried out, the noise components are also subjected to integration, which prevents generation of accurate displacement data. FIG. 4A shows a result of integration of second order performed on the time series data of acceleration shown in FIG. 3C with respect to time. As shown in FIG. 4A, it is observed that displacement increases with time. This is because, the time series data of acceleration to be subjected to integration contains noise components and those noise components are increasingly accumulated through integration. In general, if displacement at a given point of the tread portion of a tire that is rotating in a steady manner is observed, cyclical deformation is typically repeated with a duration corresponding to one round of tire rotation as one cycle. This means, as a general rule, it is unlikely that the deformation increases with time as shown in FIG. 4A.

Therefore, in order to allow the displacement data obtained through time integration of second order to repeat cyclical changes with a duration corresponding to one round of tire rotation as one cycle, the following processes are carried out.

Noise components contained in the displacement data are calculated as the background component 2 in a similar manner as used for calculating the background component 1 in step S104 (step S110).

Figure 4B:
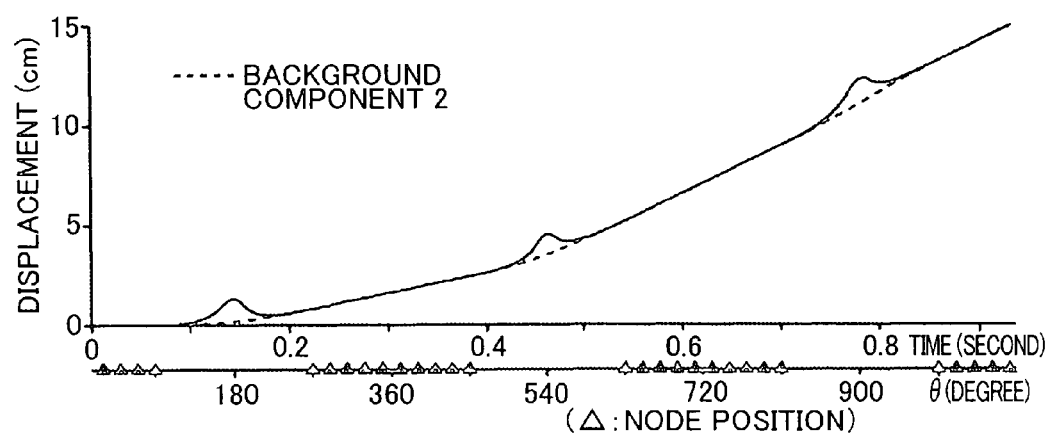

More specifically, a region of the tire circumference is divided into a third region including a contact region in contact with a road surface and a fourth region including other than the third region. The regions which are defined as the third region include a region having a $\theta$ of greater than 90 degree and less than 270 degree, a region having a $\theta$ of greater than 450 degree and less than 630 degree, and a region having a $\theta$ of greater than 810 degree and less than 990 degree. The regions that are defined as the fourth region include a region having a $\theta$ of equal to or greater than 0 degree and equal to or less than 90 degree, and equal to or greater than 270 degree and equal to or less than 360 degree; a region having a $\theta$ of equal to or greater than 360 degree and equal to or less than 450 degree, and equal to or greater than 630 degree and equal to or less than 720 degree; and a region having a $\theta$ of equal to or greater than 720 degree and equal to or less than 810 degree, and equal to or greater than 990 degree and equal to or less than 1080 degree. The background component 2 is obtained by using a plurality of positions ($\theta$, or time corresponding to $\theta$) on the circumference in the fourth region as nodes so as to calculate a second approximation curve to the data in the third and fourth regions through least squares method using a set of predetermined functions. The third region may be the same with or different from the above-described first region. Also, the fourth region may be the same with or different from the above-described second region. As described above, the nodes provide constraint conditions on the horizontal axis, that set local curvatures (jog) of the spline functions. FIG. 4B shows the second approximation curve representing the background component 2 with a dotted line. In the example shown in FIG. 4B, the positions as indicated by "Δ" in FIG. 4B, that is, the positions of time where $\theta$ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1010 degree, 1030 degree, 1050 degree, and 1070 degree are defined as the node positions.

By carrying out function approximation on the data shown in FIG. 4A with the third-order spline functions having the above described nodes, a second approximation curve as indicated by dotted lines in FIG. 4B is calculated. When carrying out function approximation, there are no nodes in the third regions, and only the plurality of nodes in the fourth regions are used. In least squares method that is carried out in conjunction with the function approximation, the weighting coefficient for the fourth region is set to 1, and the weighting coefficient for the third regions is set to 0.01. The reason why the weighting coefficient for the third regions is smaller than the weighting coefficient for the fourth regions, and no nodes are set in the third regions in calculating the background component 2, is to calculate the background component 2 by using the displacement data mainly in the fourth regions. In the fourth regions, because deformation of the tread portion due to contact is small and such deformation changes smoothly on the circumference, the tire deformation is small on the circumference and such changes are also extremely small. In contrast, in the third regions, the tire tread portion is greatly displaced based on deformation due to contact and changes rapidly. For this reason, the deformation due to contact is great on the circumference and changes rapidly. In other words, the deformation of the tread portion in the fourth region is substantially constant as compared to the deformation in the third region. Accordingly, by calculating the second approximation curve mainly using the displacement data obtained in the fourth regions through integration of second order, the deformation of the rotating tire can be obtained accurately, not only in the fourth regions, but also in the third regions including the contact region.

FIG. 4B shows the second approximation curve calculated mainly using the displacement data in the fourth regions with dotted lines. In the fourth regions, the second approximation curve substantially coincides with the displacement data (solid lines).

Then, the approximation curve calculated as the background component 2 is subtracted from the displacement data calculated in step S110, so that the distribution of deformation on the circumference of the tread portion due to contact deformation is calculated (step S112).

Figure 4C:
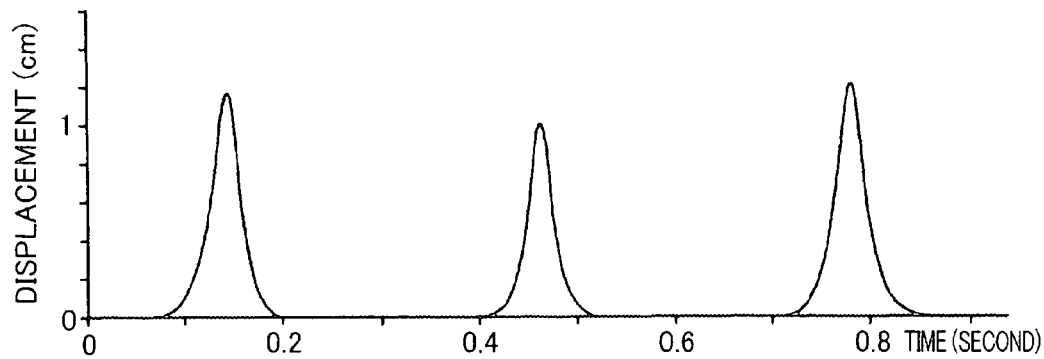

FIG. 4C shows the distribution of deformation of the tread portion due to contact deformation, calculated by subtracting the second approximation curve (dotted line) from the displacement signal (solid line) shown in FIG. 4B. FIG. 4C shows the distribution of deformation when the predetermined measurement positions on the tread portion rotate and displace on the circumference, for a duration corresponding to three rounds of tire rotation (three times of contact). As is observed, the deformation changes at every contact.

Lastly, the time series data of deformation in the tread portion shown in FIG. 4C is subjected to differentiation of second order with respect to time so as to calculate the time series data of acceleration corresponding to the deformation of the tread portion with noise components being eliminated from the acceleration shown in FIG. 3D, that is, the time series data of acceleration due to contact deformation of the tread portion (refer to subsequently described FIG. 5A) free from noise components (step S113).

The data of deformation thus calculated and the time series data of acceleration due to tire deformation obtained in step S113 are supplied to the slip region specifying unit 20 and used for determining a contact region.

Next, from the data of deformation of the tire obtained in step S112 and the time series data of acceleration due to tire deformation obtained in step S113, the contact region is determined (step S114).

Figure 5A:
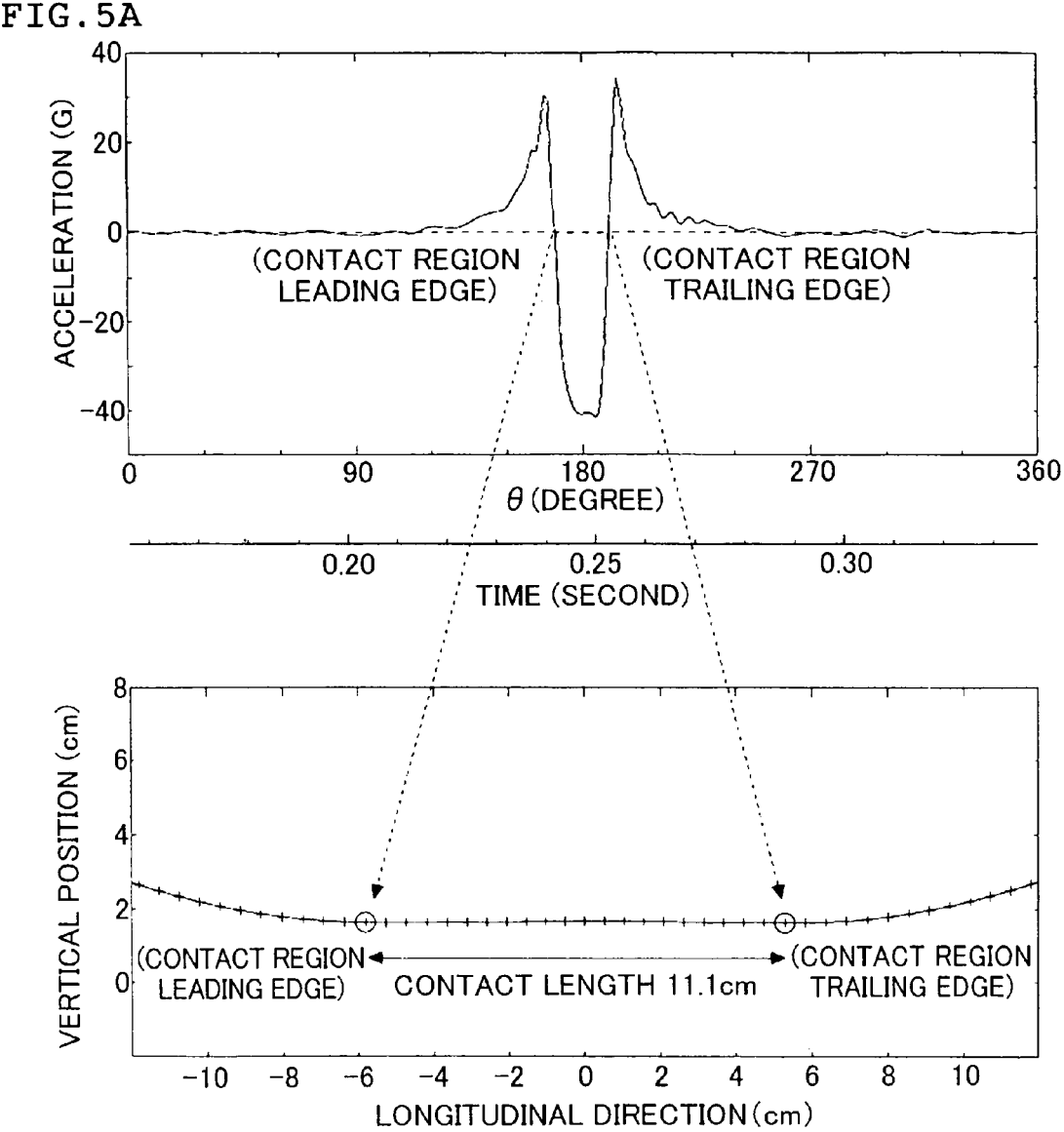
FIGS. 5A and 5B are explanatory charts illustrating a method of calculating a contact length using the tire slip state detecting method of the present invention.

FIG. 5A illustrates a method of determining a contact region.

First, in the time series data of acceleration due to contact deformation at the tread portion of the tire, which is extracted in step S113, and does not contain noise components, two points are determined at which acceleration crosses 0 with a sharp change.

Next, positions in the displacement data that are corresponding to the two points as obtained above are determined, so that such positions are defined as positions of a contact leading edge and a contact trailing edge, as shown in FIG. 5A. The reason why the portions at which the time series data of acceleration changes sharply can be determined as the contact leading edge and the contact trailing edge, is because the acceleration components in the centrifugal force due to tire rotation changes rapidly each time when the tread portion rotates to enter the contact region or exit the contact region. Further, it is possible to clearly determine the positions at which the time series data of acceleration crosses 0.

The lower graph in FIG. 5A shows the deformation shape of the tire deformed due to contact. The graphs are shown by converting a polar coordinate system that is represented by the radial direction and the circumferential direction of the tire into an orthogonal coordinate system that is represented by the vertical direction and the longitudinal direction of the tire.

Although, the above example is for determining the contact region based on the deformation in the radial direction by using the acceleration in the tire radial direction, it is also possible to determine the contact region according to the deformation in the tire circumferential direction obtained by using the acceleration in the tire circumferential direction. It is known that, in the circumferential direction in the contact region, a contact leading edge and a contact trailing edge largely deform in different directions to each other. Such deformation can be utilized to define the contact leading edge and the contact trailing edge.

The contact length of the contact region determined in this manner, accurately coincides with the contact length obtained through simulation using finite element models of the tire. This indicates accurate determination of the contact region is achieved.

Figure 5B:
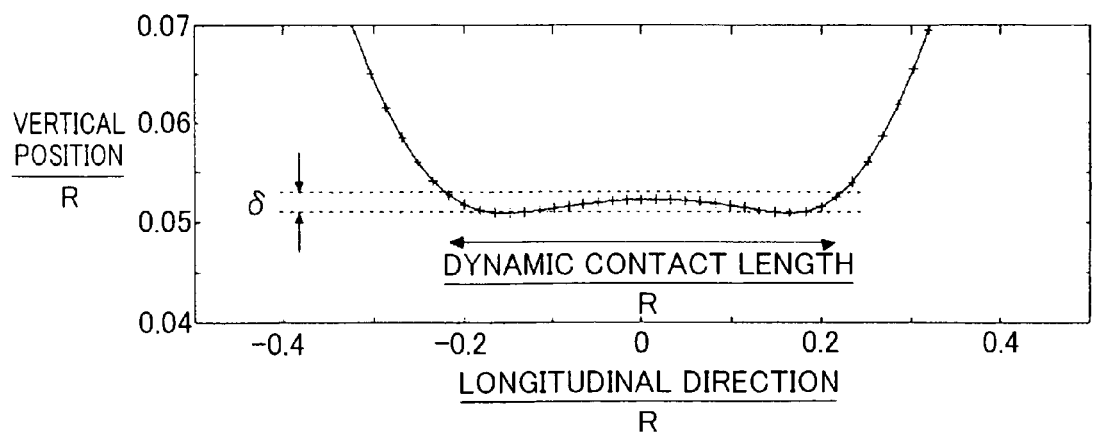

Alternatively, instead of using the method shown in FIG. 5A, a method shown in FIG. 5B may be used to obtain the contact region and the contact length.

FIG. 5B is a graph showing the deformation shape of the tire, in which the positions in longitudinal direction of the tire are divided by an outer diameter R of the tire tread portion and normalized, the positions in the vertical direction of the tire are divided by the outer diameter R and normalized, and the position of the center of the tire contact is defined as the origin. As shown in FIG. 5B, the positions at which the tire deformation shape crosses a liner line that has a predetermined distance $\delta$ toward upward direction of the tire away from the lowest point in the vertical direction are defined as the normalized position corresponding to the contact leading edge and the normalized positions corresponding to the contact trailing edge respectively. The normalized positions are multiplied by the outer diameter R to obtain the positions of the contact leading edge and the contact trailing edge. This allows determination of the contact region.

The predetermined distance $\delta$ used for defining the leading edge position and the trailing edge position is, for example, preferably within a range of 0.001 to 0.005. Alternatively, the positions at which a line of a square value of the distance of the tread portion upward away from the lowest point crosses a predetermined value may be assumed as the contact leading edge and the contact trailing edge. In this case, the predetermined value is, for example, within a range of 0.00002 (cm$^2$) to 0.00005 (cm$^2$), and preferably, 0.00004 (cm$^2$). A significantly high correlation that has been observed between the measurement result obtained through an extensive examination of the contact length using various loads applied to a stationary tire and the result of the contact length obtained in the above described method, demonstrates that the contact region is determined with high accuracy.

Figure 6:
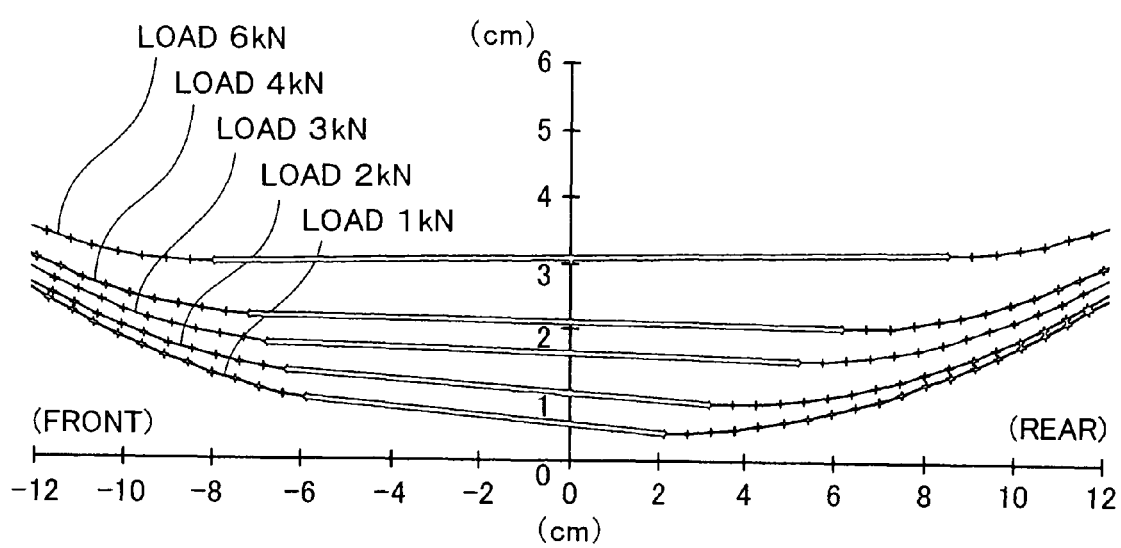
FIG. 6 shows an example of a contact region identified by the tire slip detecting method of the present invention.

FIG. 6 shows examples of contact region obtained by the method shown in FIG. 5A. In FIG. 6, thicker lines highlight the contact region.

On the other hand, the acceleration data (second data) in the tire width direction, which has been converted into digital data is subjected to filtering processing and is separated into high frequency component data and low frequency component data (step S202).

For filtering processing, digital filters that have a certain frequency as a cut-off frequency are used. The cut-off frequency changes depending on rotation speeds or noise components. For example, if the rotation speed is 60 (Km/h), the cut-off frequency is between 0.5 and 2 (kHz). Alternatively, instead of using the digital filters, moving average process, trend model process, and other suitable processes may be used as the smoothing processing.

Figure 7A:
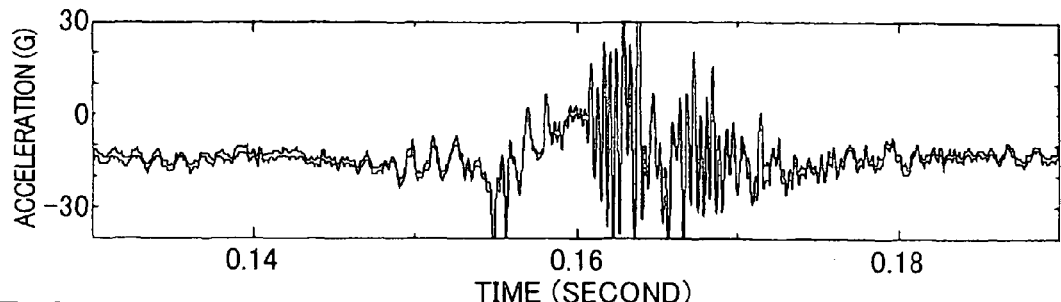
FIGS. 7A to 7E are explanatory charts illustrating one example of a method of identifying a contact region in the tire slip state detecting method of the present invention.
Figure 7B:
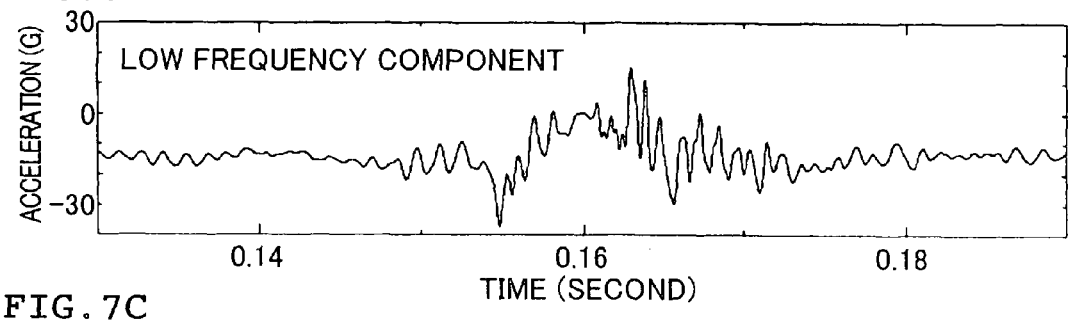
Figure 7C:
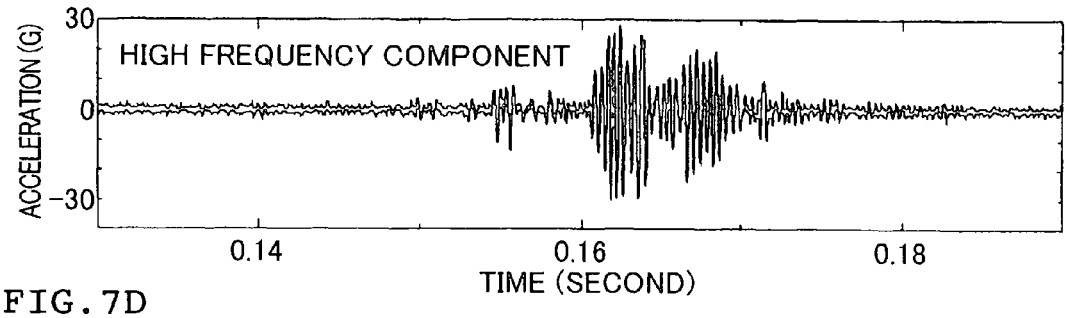

FIG. 7A shows an example of measurement data of acceleration (second data) in the tire width direction. FIG. 7B shows the low frequency component data separated through filtering processing. FIG. 7C shows the high frequency component data separated through filtering processing.

Figure 7D:
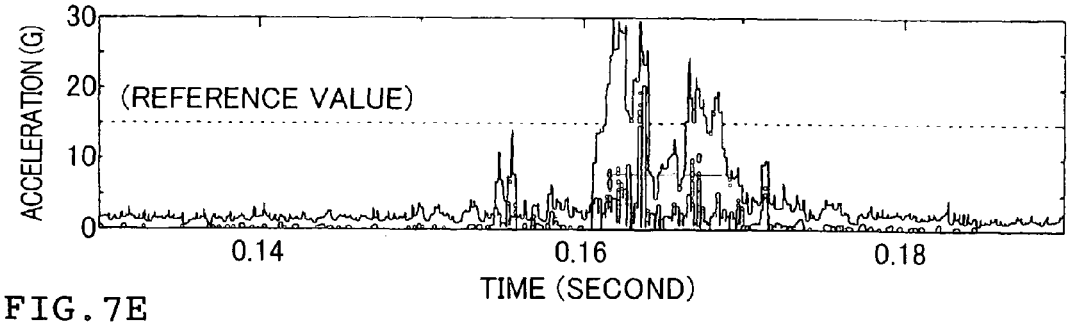

Then, full-wave rectifying is carried out on the high frequency component data (step S204). FIG. 7D shows a result of full-wave rectifying of the high frequency component data shown in FIG. 7C.

Further, the resulted high frequency component data is compared with a predetermined reference value. Pulses are generated to the data that are equal to or higher than the reference value to form a pulse train (step S206).

Then, from the information of the contact region determined in step S114, and the data of pulse train obtained in step S206, the slip region in the contact region is identified (step S208).

If, in a range in the determined contact region, the number of pulses in the generated pulse train exceeds a predetermined number (a predetermined frequent number), the range is determined as the slip region. Accordingly, determination of the slip region is performed in such a manner that high frequency components of a predetermined frequency range are obtained from the second data, and based on the level of amplitude in the high frequency components, the slip region is determined.

Figure 7E:
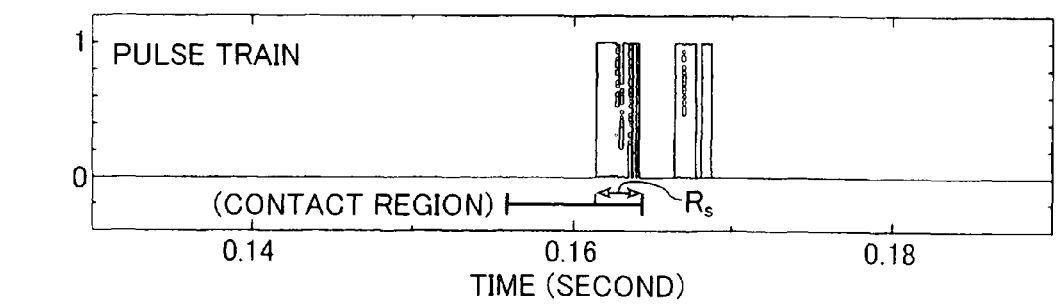

The predetermined period of time above described and predetermined frequent number above described are set so as to change depending on the rotation speed of the tire. FIG. 7E shows the region $R_s$ in the contact region, that is determined as the slip region.

The reason why the slip region can be specified based on the frequent number of pulses in the pulse train is because, in an adhesion region the tread portion of the tire adheres to the road surface, while in a slip region the tread portion of the tire slips to the road surface therefore to generate small oscillation. The generation of small oscillation allows specification of the slip region.

Alternatively, instead of generating a pulse train, the slip region can be specified by determining whether the power value in the predetermined range of frequency contained in the high frequency components obtained through filtering processing in step S202, exceeds a predetermined value or not.

Figure 8A:
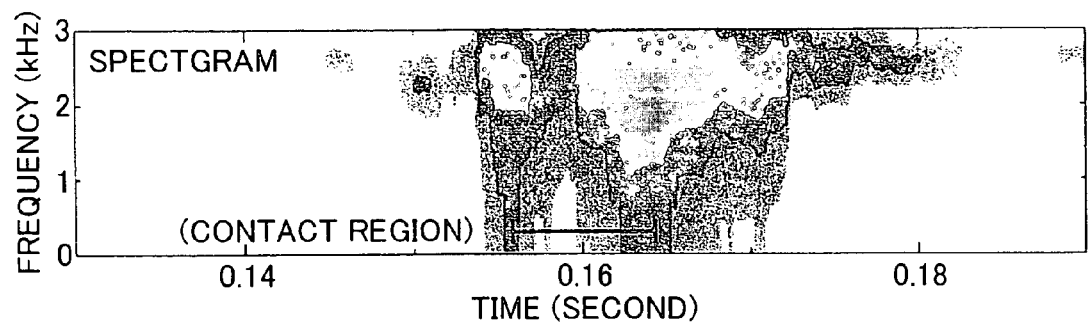
FIGS. 8A and 8B are explanatory charts illustrating other example of a method of identifying a contact region in the tire slip state detecting method of the present invention.

Specifically, the high frequency components shown in FIG. 7C are segmented on a predetermined time interval basis, and the frequency components and the spectrum power value in each time interval in the data of FIG. 7C are obtained, for example, by obtaining a coefficient for each time interval using the maximum entropy method, by using the wavelet transformation, or by using FFT (Fast Fourier Transformation). The graph shown in FIG. 8A is a spectgram showing how the frequency components change in each time interval, with indication of levels of spectrum power value. As is seen, the higher the spectrum power value, the higher the gray density.

Figure 8B:
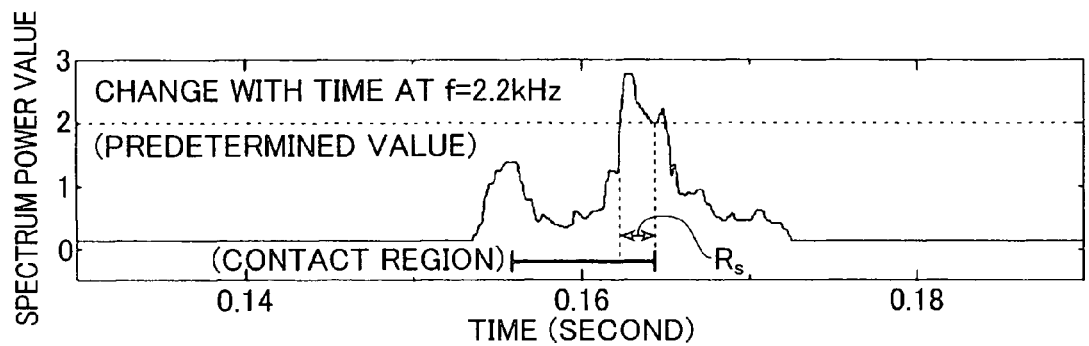

In this spectgram, within the contact region already determined, a region in which the spectrum power value in a predetermined frequency range exceeds a predetermined value is defined as the slip region. In FIG. 8B, the region $R_s$ is the slip region. The reason why the slip region can be specified by determining whether or not the spectrum power value of a predetermined frequency range exceeds the predetermined value is that the frequency of the small oscillation generated in the slip region is generally constant, and in the slip region, the small oscillation becomes larger.

The slip region thus obtained is compared with the contact region in terms of the length, and an area ratio of the slip region to the contact region is obtained. Based on the ratio, such as the safety margin until the limit of occurrence of slide slip behavior is obtained in the data output unit 22. The obtained output data is sent to the display 28 and used in such as displaying graphs.

Information of the slip state including such as the ratio of the slip region obtained in the above described manner can be displayed on a driving display panel for the driver. Also, the information can be supplied to a motion control system of the vehicle. For being utilized in these opportunities, the information should be provided in an efficient and speedy manner, which in turn requires individual processes to be performed at a high speed.

In order to achieve the above requirement, a plurality of acceleration sensors 2 are arranged on the circumference of the tire, and pieces of information from respective acceleration sensors 2 are merged and processed before the tire completes one round of rotation, so that the information of the slip state can be outputted within the duration of one round of tire rotation.

In addition, arranging a plurality of acceleration sensors 2 in the tire width direction, allows a state of the slip region of respective positions in the width direction to be obtained as two-dimensional information, so that detailed information of the slip state can be outputted.

The measurement data of acceleration that can be used in the present invention includes, in addition to the measurement data obtained by the acceleration sensor affixed to the inner circumference surface of the tread portion, the measurement data obtained by an acceleration sensor embedded inside of the tire.

INDUSTRIAL APPLICABILITY

As described heretofore, in the present invention, since the contact region of the tire is determined from the measurement data of acceleration in the radial direction of the tire, by using the determined region, the slip state in the contact region can be efficiently specified from the measurement data of acceleration.

Specification of the slip state can be achieved with high accuracy because high frequency components of a specified frequency range are extracted from the acquired measurement data of acceleration of the tire, preferably, from the acquired measurement data of acceleration in the width direction of the tire, and the slip region is specified based on the amplitude level in the high frequency components. In particular, efficient and accurate specification of the slip region is achieved by specifying the slip region if the frequent number of occurrences in which the amplitude level of the high frequency components exceeds a reference value is higher than a predetermined frequent number. Consequently, estimation and prediction of occurrence of the slide slip behavior can be achieved based on the information of the slip state in the contact region of the tire, and the predicted information can be displayed on the driving display panel of the vehicle.

The invention claimed is:

1. A tire slip state detecting method for detecting a slip state in a contact region of a tire which is rotating on a road surface, the method comprising:
   an acquiring step for acquiring measurement data of acceleration at a tread portion of the rotating tire for a duration corresponding to at least one round of tire rotation, the measurement data including at least measurement data of acceleration in a radial direction of the tire;
   a contact region determining step including,
      extracting time series data of acceleration due to tire deformation from the acquired measurement data in the radial direction,
      subjecting the time series data of acceleration due to tire deformation to a time integration of second order to obtain displacement data, thereby calculating a deformation in the tread portion of the tire, and
      determining, from the calculated deformation, a contact region of the tire during rotation;
   a slip region specifying step for specifying, from the measurement data of acceleration acquired in the acquiring step, a slip region within the determined contact region.

2. The tire slip state detecting method according to claim 1, wherein in the slip region specifying step, high frequency components of a predetermined frequency range is extracted from the measurement data of acceleration acquired in the acquiring step to specify the slip region based on an amplitude level in the high frequency components.

3. The tire slip state detecting method according to claim 2, wherein the slip region is specified when a frequent number of occurrences in which an amplitude level of the high frequency components exceeds a reference value, is higher than a predetermined frequent number.

4. The tire slip state detecting method according to claim 1, wherein in the slip region specifying step, an area ratio of the slip region to the contact region is calculated to evaluate the slip state in quantity.

5. The tire slip state detecting method according to claim 1, wherein the contact region determining step including:
   a step of dividing a region on a circumference of the tread portion of the tire into a first region including a contact region in contact with the road surface, and a second region including other than the first region, approximating the measurement data in the radial direction in the second region to calculate a first approximation curve defined in the first and second regions, and subtracting the first approximation curve from the measurement data in the radial direction to extract time series data of acceleration due to tire deformation in the first and second regions; and
   a step of dividing a region on the circumference of the tread portion of the tire into a third region including a contact region in contact with the road surface, and a fourth region including other than the third region, and approximating the displacement data in the fourth region to calculate a second approximation curve defined in the third and fourth regions, and subtracting the second approximation curve from a waveform of the displacement data to calculate a deformation of the tire.

6. The tire slip state detecting method according to claim 5, wherein the first approximation curve is a curve which approximates the measurement data in the radial direction in the first region in addition to the second region, using a plurality of data points of the measurement data in the radial direction in the second region as nodes.

7. The tire slip state detecting method according to claim 5, wherein the first approximation curve is a curve calculated by applying weighting coefficients to the time series data of acceleration in the first region and to the time series data of acceleration in the second region; and a greater weighting coefficient is applied to the time series data of acceleration in the second region than a weighting coefficient applied to the time series data of acceleration in the first region to approximate the time series data of acceleration in the first and second regions.

8. The tire slip state detecting method according to claim 5, wherein the second region and the fourth region have an angle in a circumferential direction of at least 60 degree in absolute values, the angle being obtained relative to a center position of the contact region of the tire.

9. The tire slip state detecting method according to claim 5, wherein the second approximation curve is a curve which approximates the displacement data in the fourth region in addition to the fourth region, using a plurality of data points in the displacement data in the fourth region as nodes.

10. The tire slip state detecting method according to claim 5, wherein the second approximation curve is a curve calculated using a least squares method by applying weighting coefficients to the displacement data in the third region and to the displacement data in the fourth region, and a greater weighting coefficient is applied to the displacement data in the fourth region than a weighting coefficient applied to the displacement data in the third region to approximate the displacement data in the third and fourth regions.

11. The tire slip state detecting method according to claim 1, wherein the measurement data of acceleration is obtained through an acceleration sensor arranged on the tread portion of the tire.

12. The tire slip state detecting method according to claim 11, wherein a plurality of acceleration sensors are arranged on the circumference of the tread portion of the tire.

13. The tire slip state detecting method according to claim 11, wherein the plurality of acceleration sensors are arranged in a width direction of the tread portion of the tire.

14. The tire slip state detecting method according to claim 1, wherein the contact region is determined by obtaining two positions at which the tire series data of acceleration due to tire deformation crosses an acceleration of zero, and by taking the two positions as a leading edge and a trailing edge of the contact region of the tire.

15. The tire slip state detecting method according to claim 14, wherein the time series data of acceleration due to tire deformation which is used in the determination of the contact region is obtained by subjecting the calculated deformation of the tread portion to a differentiation of second order with respect to time.

16. The tire slip state detecting method according to claim 1, wherein a deformation shape of the tire is obtained from the displacement data, and the contact region is determined by defining positions at which the tire deformation shape crosses a line having a certain distance in an upward direction away from a lowest point in the tire as a leading edge and a trailing edge of the contact region.

17. A tire slip state detecting apparatus for detecting a slip state in a contact region of a tire which is rotating, the apparatus comprising:
   an acquiring unit configured to acquire measurement data of acceleration at a tread portion of the rotating tire for a duration corresponding to at least one round of tire rotation, the measurement data including at least measurement data of acceleration in a radial direction of the tire;

a contact region determining unit comprising:
- a signal processing unit configured to extract time series data of acceleration due to tire deformation from the acquired measurement data in the radial direction, and
- a deformation calculating unit configured to subject the time series data of acceleration due to tire deformation to a time integration of second order to calculate displacement data, so as to calculate a deformation in the tread portion of the tire, wherein the contact region determining unit is configured to determine, from the calculated deformation, a contact region of the tire during rotation; and a slip region specifying unit configured to specify, from the measurement data of acceleration acquired in the acquiring step, a slip region within the determined contact region.

* * * * *